United States Patent
Mähler et al.

(10) Patent No.: US 12,530,034 B2
(45) Date of Patent: Jan. 20, 2026

(54) SWARM ASSISTANCE SYSTEM AND METHOD FOR AUTONOMOUS AGRICULTURAL UNIVERSAL PRODUCTION MACHINES

(71) Applicant: CLAAS E-Systems GmbH, Dissen a.T.W. (DE)

(72) Inventors: Reinhold Mähler, Rheda-Wiedenbrück (DE); Christian Ehlert, Bielefeld (DE); Bastian Bormann, Gütersloh (DE); Joachim Baumgarten, Beelen (DE); Dennis Neitemeier, Lippetal (DE); Johann Witte, Fröndenberg (DE); Jannik Redenius, Oldendorf (DE); Arne Bohl, Gütersloh (DE); Eberhard Nacke, Gütersloh (DE); Christoph Apke, Bielefeld (DE); Timo Korthals, Leopoldshöhe (DE); Waldemar Thiesmann, Osnabrück (DE); Axel Schröder, Gütersloh (DE); Robin Monkenbusch, Rheda-Wiedenbrück (DE)

(73) Assignee: CLAAS E-Systems GmbH, Dissen a. T.W. (DE)

( * ) Notice: Subject to any disclaimer, the term of this patent is extended or adjusted under 35 U.S.C. 154(b) by 169 days.

(21) Appl. No.: 18/139,525

(22) Filed: Apr. 26, 2023

(65) Prior Publication Data

US 2023/0350423 A1    Nov. 2, 2023

(30) Foreign Application Priority Data

Apr. 27, 2022 (DE) ................... 10 2022 110 211.4

(51) Int. Cl.
*G05D 1/00*    (2024.01)
*G06Q 30/0645*    (2023.01)

(52) U.S. Cl.
CPC ......... *G05D 1/0287* (2013.01); *G05D 1/0088* (2013.01); *G06Q 30/0645* (2013.01)

(58) Field of Classification Search
None
See application file for complete search history.

(56) References Cited

U.S. PATENT DOCUMENTS

| | | | |
|---|---|---|---|
| 5,712,782 A | * | 1/1998 | Weigelt .............. G05B 19/4183 701/25 |
| 6,803,854 B1 | | 10/2004 | Adams et al. |

(Continued)

FOREIGN PATENT DOCUMENTS

| | | |
|---|---|---|
| DE | 19914829 A1 | 1/2001 |
| DE | 102006045280 A1 | 4/2008 |

(Continued)

OTHER PUBLICATIONS

European Search Report for European Patent Application 23155751.3 dated Sep. 29, 2023.

(Continued)

*Primary Examiner* — Rachid Bendidi
*Assistant Examiner* — Nada Mahyoob Alqaderi
(74) *Attorney, Agent, or Firm* — Lempia Summerfield Katz LLC (57) ABSTRACT

A swarm assistance system for autonomous agricultural universal production machines is disclosed. The swarm assistance system is integrated into an agricultural work network. The agricultural work network connects autonomous agricultural universal production machines as providers of agricultural jobs and customers of agricultural jobs with each other and with the swarm assistance system. The autonomous agricultural universal production machines are configured to perform a plurality of different agricultural jobs by being equipped with changing work assemblies. The (Continued)

swarm assistance system receives request data relating to a requested agricultural job from the customers, matches the request data with capacity data of at least one of the agricultural universal production machines and, based on the result of the matching, rents at least one agricultural universal production machine to perform the requested agricultural job.

19 Claims, 5 Drawing Sheets

(56) References Cited

U.S. PATENT DOCUMENTS

| | | | |
|---|---|---|---|
| 7,873,617 B2 | 1/2011 | Wippersteg et al. | |
| 11,466,998 B1* | 10/2022 | Williams | G06Q 10/0635 |
| 2002/0103688 A1* | 8/2002 | Schneider | G06Q 10/0637 |
| | | | 705/26.1 |
| 2007/0005202 A1 | 1/2007 | Breed | |
| 2008/0005177 A1 | 1/2008 | Steckel et al. | |
| 2008/0098035 A1 | 4/2008 | Wippersteg et al. | |
| 2010/0094499 A1 | 4/2010 | Anderson | |
| 2015/0105965 A1 | 4/2015 | Blackwell et al. | |
| 2015/0377945 A1 | 12/2015 | Schlipf et al. | |
| 2016/0340867 A1 | 11/2016 | Matsuzaki | |
| 2017/0131718 A1 | 5/2017 | Matsumura et al. | |
| 2017/0192431 A1 | 7/2017 | Foster | |
| 2017/0228832 A1* | 8/2017 | Tuttle | G06Q 30/0645 |
| 2017/0311534 A1 | 11/2017 | Rusciolelli et al. | |
| 2017/0336787 A1 | 11/2017 | Pichlmaier et al. | |
| 2018/0173233 A1 | 6/2018 | Matsuzaki | |
| 2018/0225892 A1* | 8/2018 | Miura | G07C 5/008 |
| 2018/0232674 A1* | 8/2018 | Bilde | G06Q 10/06 |
| 2018/0319392 A1 | 11/2018 | Posselius | |
| 2019/0035282 A1* | 1/2019 | Ferguson | G05D 1/0033 |
| 2019/0235487 A1 | 8/2019 | Zhao et al. | |
| 2019/0364734 A1* | 12/2019 | Kriebel | G05D 1/0217 |
| 2020/0159220 A1* | 5/2020 | Hurd | G05D 1/247 |
| 2020/0285970 A1* | 9/2020 | Dagley | G06Q 10/20 |
| 2020/0404846 A1 | 12/2020 | Fattey et al. | |
| 2021/0089051 A1* | 3/2021 | Markov | G05D 1/0291 |
| 2021/0173399 A1 | 6/2021 | Richard et al. | |
| 2021/0357664 A1 | 11/2021 | Kocer et al. | |
| 2022/0067846 A1* | 3/2022 | Grundmann | G06Q 40/08 |
| 2022/0087091 A1 | 3/2022 | Nieto Lara et al. | |
| 2022/0198643 A1 | 6/2022 | Sharma et al. | |
| 2022/0269282 A1 | 8/2022 | Ascherl et al. | |
| 2022/0366730 A1 | 11/2022 | Mangus et al. | |
| 2022/0400597 A1 | 12/2022 | Tamatani et al. | |
| 2022/0414608 A1* | 12/2022 | Kocer | G06Q 30/0282 |
| 2023/0152797 A1* | 5/2023 | Hurd | G05D 1/692 |
| | | | 701/2 |
| 2023/0350407 A1* | 11/2023 | Mähler | A01B 69/008 |
| 2023/0350423 A1* | 11/2023 | Mähler | G06Q 50/02 |
| 2023/0367333 A1* | 11/2023 | Hoellinger | G05D 1/0297 |

FOREIGN PATENT DOCUMENTS

| | | | | |
|---|---|---|---|---|
| DE | 102018113327 A1 | | 12/2019 | |
| DE | 102019000792 A1 | | 8/2020 | |
| DE | 102020104064 A1 | * | 8/2021 | A01B 69/008 |
| EP | 0740896 B1 | | 12/2007 | |
| EP | 2174537 A1 | | 4/2010 | |
| EP | 2177965 A2 | | 4/2010 | |
| EP | 2177965 B1 | | 3/2015 | |
| EP | 3336646 A1 | | 6/2018 | |
| EP | 3783529 A1 | | 2/2021 | |
| EP | 3864945 A1 | | 8/2021 | |
| EP | 3965030 A1 | | 3/2022 | |
| WO | 2015173073 A1 | | 11/2015 | |

OTHER PUBLICATIONS

Jensen, Martin Andreas Falk, et al. "In-field and inter-field path planning for agricultural transport units." Computers & Industrial Engineering 63.4 (2012): 1054-1061.

* cited by examiner

SWARM ASSISTANCE SYSTEM AND METHOD FOR AUTONOMOUS AGRICULTURAL UNIVERSAL PRODUCTION MACHINES

CROSS REFERENCE TO RELATED APPLICATION

This application claims priority under 35 U.S.C. § 119 to German Patent Application No. DE 10 2022 110 211.4 filed Apr. 27, 2022, the entire disclosure of which is hereby incorporated by reference herein. This application incorporates by reference herein the following US applications in their entirety: U.S. application Ser. No. 18/139,520 entitled "AUTONOMOUS AGRICULTURAL PRODUCTION MACHINE"; U.S. application Ser. No. 18/139,528 entitled "METHOD AND SYSTEM FOR MONITORING AUTONOMOUS AGRICULTURAL PRODUCTION MACHINES"; U.S. application Ser. No. 18/139,532 entitled "METHOD AND SYSTEM FOR MONITORING OPERATION OF AN AUTONOMOUS AGRICULTURAL PRODUCTION MACHINE"; and U.S. application Ser. No. 18/139,538 entitled "SYSTEM AND METHOD FOR DEPLOYMENT PLANNING AND COORDINATION OF A VEHICLE FLEET".

TECHNICAL FIELD

The present application relates to a swarm assistance system for autonomous universal agricultural production machines, to a method for performing an agricultural job, to an autonomous agricultural production machine, and to a computer program.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Autonomous vehicles are presently generally known in the field of road traffic. In principle, different levels of autonomy are known, ranging from minor technical support of a human driver to the vehicles understood here as being "autonomous", which can and may legally and technically handle complex driving tasks without direct human supervision (e.g., being fully automatic in operation without any human intervention).

In addition to the known autonomous motor vehicles, autonomy approaches are also being pursued in other areas. Here, autonomous agricultural machines are specifically considered. Although autonomous agricultural machines are conceptually similar to autonomous motor vehicles, they are to be regarded as significantly different overall. Autonomous agricultural machines are not used to transport people, but generally to perform agricultural jobs.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As discussed in the background, autonomous agricultural machines have been used. In principle, a distinction may be made between two concepts of autonomous agricultural machines. On the one hand, autonomous agricultural machines may be specialized, such as an autonomous combine harvester or even an autonomous wheat combine harvester, or they may be generalized. The focus here is on such generalized autonomous agricultural production machines as autonomous agricultural universal production machines. These autonomous universal agricultural production machines are distinguished by the fact that they may be used for a variety of different agricultural jobs by changing configurations such as changing work assemblies and changing software modules.

In particular, such autonomous universal agricultural production machines may have decisive advantages in terms of their capacity and purchase costs, but have the disadvantage that they are technically more demanding, especially in terms of software. An AI model that is trained to always harvest only wheat with the same technical equipment is technically easier to realize than an AI model that can perform any agricultural job with any equipment.

However, there is the very general problem that autonomous agricultural universal production machines must be effectively adapted to the agricultural job (such as to the particular agricultural job).

For manned agricultural production machines, data sets may be compiled using a data configurator in such a way that they are specifically tailored to the needs of an agricultural machine. See US Patent Application Publication No. 2008/0005177 A1, incorporated by reference herein in its entirety.

Furthermore, available machine resources may be planned at an early stage and in a coordinated manner with regard to harvest time windows of different actors. See U.S. Pat. No. 7,873,617, incorporated by reference herein in its entirety.

Planning of machine resources may be performed in stages, such as starting with early general planning followed by field planning shortly before the start of use, and to operation-specific detailed planning. See EP 2 174 537 A1, incorporated by reference herein in its entirety.

In the field of autonomous automobiles, the idea that individual users may no longer owning their own car but may rent one as needed has been discussed for some time as a future solution for increasing efficiency. This may significantly increase the utilization of autonomous vehicles. Against the backdrop of limited resources, this idea provides one of the few technical solutions that could massively reduce resource consumption. However, in the case of automobiles, their intended use, equipment, and environmental conditions often fall within the same context or framework.

The situation may be completely different for autonomous universal agricultural production machines. An autonomous universal agricultural production machine cannot easily be used for any agricultural job. Rather, a configuration change in the area of equipment and/or software is typically required.

Also, the efficiency of performing agricultural jobs, particular field work, may be based on complex interactions between the environment, the autonomous agricultural universal production machine, its equipment with work assemblies, its maintenance status, available operating resources and the like, as well as its software and its database.

In addition, there may be economic hurdles that result in certain farmers being unable to acquire one or more autonomous universal agricultural production machines. Further, legal hurdles may limit their use such as, for example, prohibiting road travel between different fields. Overall, therefore, there is no present solution that makes it possible to increase the utilization of autonomous agricultural universal production machines, which are expensive financially and in terms of resources, that may make help to avoid wasting resources. As such, a solution may consider any one, any combination, or all of technical problems, economic problems, and legal problems.

In one or some embodiments, autonomous agricultural universal production machines may be configured to perform a variety of different agricultural tasks. In one or some embodiments, any discussion regarding autonomous may comprise automatic operation without any human intervention. With these autonomous agricultural universal production machines being regarded as actors in an agricultural work network, and that a swarm assistance system may be provided for their coordination. This swarm assistance system may be configured to coordinate one or more agricultural jobs to be performed with technical and time capacities of agricultural universal production machines and may be configured to perform an assignment of autonomous universal agricultural production machines to the requested agricultural jobs. This assignment, which may include the necessary support services and/or the general technical and economic processing, may be referred to here as leasing.

In particular, a swarm assistance system for autonomous agricultural universal production machines is disclosed, wherein the swarm assistance system may be integrated into an agricultural work network, wherein the agricultural work network is configured to connect autonomous agricultural universal production machines as providers of agricultural jobs and customers of agricultural jobs with each other and with the swarm assistance system. Further, the autonomous agricultural universal production machines may be configured to perform a plurality of different agricultural jobs by being equipped with changing work assemblies. The swarm assistance system may further be configured to receive request data relating to a requested agricultural job from the customers, to match the request data with capacity data of at least one of the agricultural universal production machines and, based on the result of the matching, to rent at least one agricultural universal production machine to perform the requested agricultural job.

In one or some embodiments, the swarm assistance system is configured to provide the autonomous agricultural universal production machine with process knowledge for performing the agricultural job. Determining and providing the process knowledge by the swarm assistance system may make it easier to use the autonomous agricultural universal production machine for almost any agricultural job. It may become possible to individualize the autonomous agricultural universal production machine for some or each of the agricultural jobs. Therefore, the resource efficiency of autonomous agricultural universal production machines may be combined with the processing efficiency of individualized agricultural production machines. As a result, the disclosed swarm assistance system may enable a division of labor between the autonomous agricultural universal production machines that perform the agricultural job and the swarm assistance system that may plan it from a broad database. The resulting modularity of the physical and data components may allow for a widespread and technically useful deployment of autonomous agricultural universal production machines.

In one or some embodiments, the request data comprises at least field information data. The field information data may be, for example, crop data such as crop type data, field dimensions, and the like. Additionally or alternatively, the capacity data may comprise at least machine data such as a possible engine power, a maintenance condition and the like. It is known from conventional agricultural production machines to combine such data for increasing the efficiency of a field cultivation or the like. In one or some embodiments, request data from a plurality of customers and capacity data from a swarm of autonomous agricultural universal production machines may be merged to determine a swarm rent plan that may be optimized as much as possible not only with respect to a single agricultural job, but also with respect to all agricultural jobs. The interchangeability of the autonomous agricultural universal production machine and the ability to customize it with the determined process knowledge may therefore further increase efficiency compared to conventional systems. Essentially, the best production machine per agricultural job may be used. This principle may be further enhanced by the fact that the autonomous agricultural universal production machines may also be individualized in terms of their work assemblies.

One or some embodiments relate to the ability to incrementally improve or update the swarm rental schedule. This may take into account the fact that boundary conditions, such as any one, any combination, or all of environmental data (e.g., weather data); requested agricultural jobs; and the availability of work assemblies and autonomous agricultural universal production machines may change over time. Adjusting the swarm rental schedule may ensure overall optimization over time.

One or some embodiments relate to the ability to determine the swarm rental plan by simulating different combinations and configurations of the autonomous agricultural universal production machine. Since the process knowledge provided to the autonomous agricultural universal production machine may always be process-dependent and may determine the efficiency with which the agricultural job is performed, the assignment of the autonomous agricultural universal production machines to the requested work lines depends on itself, so to speak. This problem may be solved using iterative simulation steps.

In one or some embodiments, the swarm assistance system is configured to control the execution of the swarm rental plan. Accordingly, in one embodiment, the swarm assistance system may be understood as a higher-level entity that is essential for the execution of the plurality of agricultural jobs. It may determine the individual process knowledge and may therefore enable the autonomous agricultural universal production machines and, in one embodiment, may even coordinate the logistics of the swarm of autonomous agricultural universal production machines as well as their work assemblies. In fact, this may make it possible for individual farmers or rental providers to provide small or larger parts of the swarm, to combine autonomous agricultural universal production machines of one provider with work assemblies of another provider if necessary and, while creating the swarm rental plan, to also take into account the fact that the particular autonomous agricultural universal production machines, which may not be released for independent road travel, must be transported to the location of their agricultural job and be equipped with the work assemblies beforehand or on site. By taking logistics into account, efficiency may further be increased. Therefore, the disclosed embodiments may offer technical assistance to the production of agricultural goods with scarce resources.

In one or some embodiments, the request data may comprise a quantitative work result. For the individual farmer, for example, as the purchaser of the agricultural job, it is often neither transparent nor important which technical means are used to perform the agricultural job. For example, the farmer may be faced with the task of harvesting his/her field. In many cases, it will not even be possible for the farmer to estimate the technical framework he/she would have to order for this. It is therefore proposed to leave the technical arrangement(s) to the swarm assistance system. The farmer orders, for example, the harvesting of a field of a certain size with a certain crop, and the swarm assistance system may ensure that this goal will be achieved as far as possible.

One or some embodiments generally relate to route planning. On the one hand, route planning is an aspect that may contribute significantly to processing efficiency, on the other hand, route planning may have an influence on the cooperation between autonomous agricultural universal production machines and customers, for example due to soil compaction, but also in the case of the additional provision of ancillary services such as the removal of harvested material or the delivery of other operating resources. It may therefore be provided that the route planning is specified by the customer himself/herself, or that the swarm assistance system determines it. In one or some embodiments, the swarm assistance system is configured to deal with both alternatives.

One or some embodiments relate to two alternative embodiments of the swarm assistance system. In one or some embodiments, the swarm assistance system is at least partially decentralized. The agricultural work network may then be, for example, a self-organizing network in which different participants provide parts of the computing capacity and partially perform tasks. Alternatively, in one or some embodiments, a centralized swarm assistance system may be provided.

In one or some embodiments, a method for performing an agricultural job is claimed. In this context, a swarm assistance system may be integrated into an agricultural work network, that the agricultural work network connects autonomous agricultural universal production machines as providers of agricultural jobs for field cultivation and customers for agricultural jobs to one another and to the swarm assistance system, that the autonomous universal production machines may be configured to perform a plurality of different agricultural jobs by being equipped with changing work assemblies, in that the swarm assistance system is configured to receive request data relating to a requested agricultural job from the customers, to match the request data with capacity data of at least one of the agricultural universal production machines and, based on the result of the matching, to rent of at least one agricultural universal production machine to perform the requested agricultural job, and in that the agricultural universal production machine performs the requested agricultural job. Reference may be made to all statements concerning the disclosed swarm assistance system with regard to the method.

In one or some embodiments, the autonomous agricultural universal production machines may rent themselves. For example, the owner may specify a framework for the rental and the autonomous agricultural universal production machine negotiates (such as automatically negotiates) the rental itself in cooperation with the swarm assistance system. Self-rental is also of interest if the swarm assistance system is decentralized. Either way, the swarm assistance system may be significantly slowed down by necessary consents from human actors.

In one or some embodiments, an autonomous agricultural production machine is disclosed for use in the disclosed method. Reference may be made to all statements concerning the proposed swarm assistance system and method.

In one or some embodiments, a computer program product (which may comprise a non-transient computer readable medium) is disclosed which comprises instructions which, when executed, cause a computing unit to function as the disclosed swarm assistance system. Various types of computer instructions are contemplated. Reference may be made to all statements concerning the proposed swarm assistance system, the proposed method, and the proposed autonomous agricultural production machine.

An exemplary application in the present case comprises a harvesting process as the agricultural task to be performed. This harvesting process may comprise, for example, the process chain of the agricultural jobs of "harvesting a crop" and "salvaging the crop". Other harvesting processes are contemplated.

As a rule, this process chain may be executed in such a way that one or more agricultural production machines designed as combine harvesters 1 may first harvest the crop 3 grown on a cultivated area 2. As an example, the part of the harvested material formed by the fruit may temporarily be stored in a grain tank on the combine harvester 1 while the remaining part of the harvested material, the straw, may be deposited in windrows on the cultivated area 2. When the straw deposited in windrows has reached a moisture content that allows the straw to be stored, a baler pulled by a tractor may compress the straw into bales of the harvested material that are first deposited on the cultivated area 2.

In another step of the process chain, the harvested material bales may be loaded by so-called lift trucks onto platform trailers towed by tractors, for example, and may be transported away for storage. Similarly, the fruit temporarily stored in the grain tank may be taken by tractor-drawn transport trailers and sent to storage or further processing.

Figure 1:
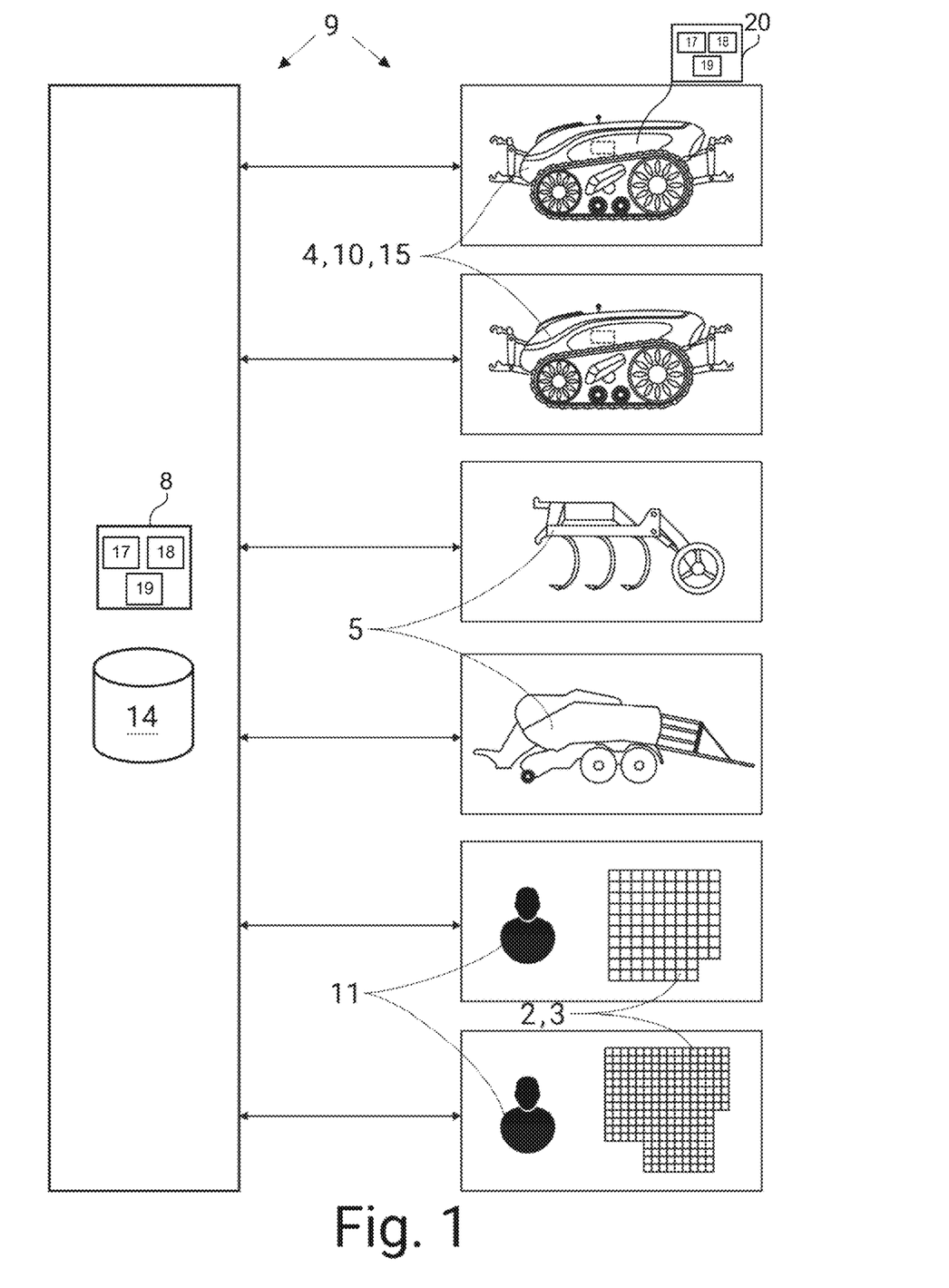
FIG. 1 schematically shows the agricultural work network.
Figure 2:
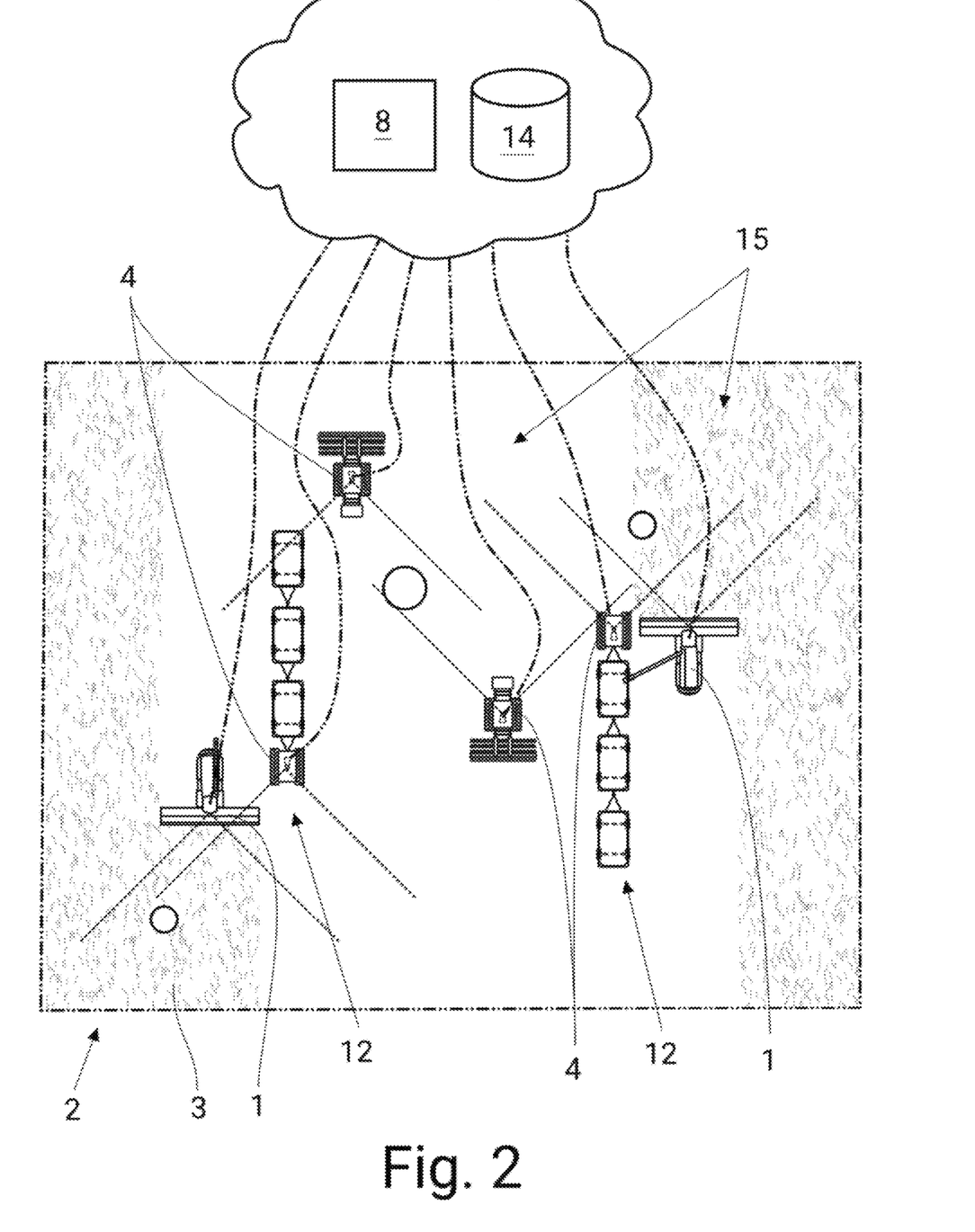
FIG. 2 illustrates the performance of an agricultural job.
Figure 3:
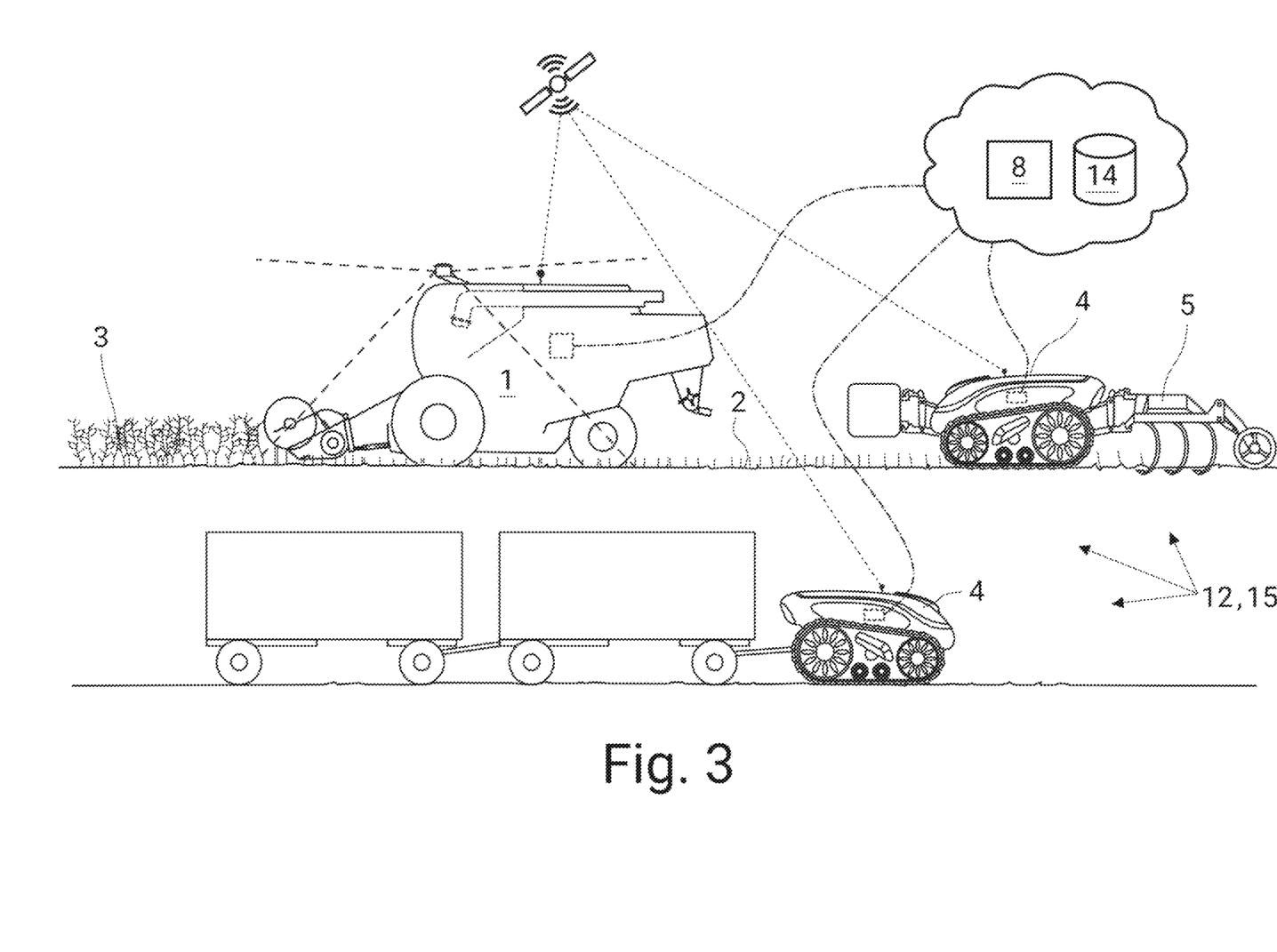
FIG. 3 illustrates the performance of another agricultural job.

In the present case, one or more of these activities may be performed by autonomous agricultural universal production machines 4 in various configurations. FIG. 1 schematically illustrates how the autonomous agricultural universal production machines 4 may be technically supported. This will be explained in more detail below. FIG. 2 illustrates, for example, cooperation between four autonomous agricultural universal production machines 4 and two autonomous combine harvesters 1 during harvesting. FIG. 3 also illustrates cooperation between autonomous agricultural universal production machines 4 and a combine harvester 1.

Figure 5:
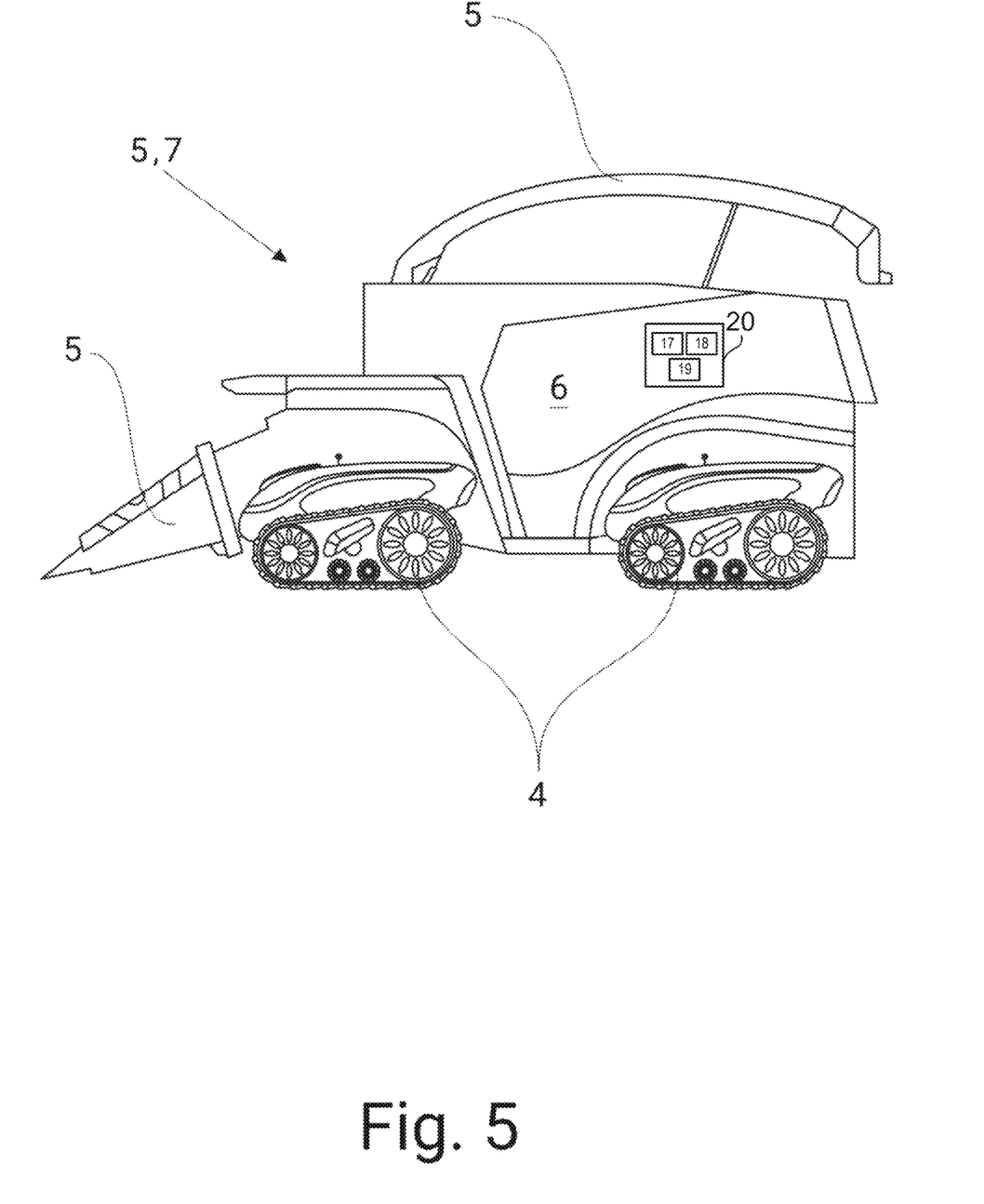
FIG. 5 illustrates two autonomous agricultural universal production machines working together as forage harvesters.

Alternatively, it is also contemplated that the autonomous agricultural universal production machines 4 are used as a combine harvester 1 by means of configuration changes, such as by equipping them with corresponding work assemblies 5. It is contemplated, for example, that a rudimentary forage harvester 6 is operated as a work assembly 5 with little electronics and no traction drive by means of one or more autonomous agricultural universal production machines 4, in that the autonomous agricultural universal production machines 4 serve as a traction drive and control and may be docked to the rudimentary forage harvester 6. Such an embodiment is depicted in FIG. 5, in which two autonomous agricultural universal production machines 4 drive, partially control, and supply power to a rudimentary forage harvester 6, therefore acting together in combination as a forage harvester 7. For example, rudimentary forage harvester 6 may include a processor 17, a memory 18, and a communication interface 19 as part of a computational functionality 20.

A swarm assistance system 8 for autonomous agricultural universal production machines 4 shown in FIG. 1 will now be disclosed. The swarm assistance system 8 may be integrated into an agricultural work network 9, wherein the agricultural work network 9 may connect autonomous agricultural universal production machines 4 as providers 10 of agricultural jobs and customers 11 of agricultural jobs to each other and to the swarm assistance system 8, and wherein the autonomous agricultural universal production machines 4 may be configured to perform a variety of different agricultural jobs by being equipped with changing work assemblies 5. The agricultural work network 9 may be configured for wired and/or wireless communication between autonomous agricultural universal production machines 4 as providers 10 of agricultural jobs, the customers 11 of agricultural jobs to each other and the swarm assistance system 8.

FIG. 1 illustrates an agricultural work network 9 in which a swarm assistance system 8 and multiple suppliers or providers 10 and customers 11 are connected. The swarm assistance system 8 may be configured to receive request data relating to a requested agricultural job from the customers 11, to match the request data with capacity data of at least one of the autonomous agricultural universal production machines 4, and to perform a rental of at least one agricultural universal production machine 4 for performing the requested agricultural job based on the result of the matching.

In one or some embodiments, an autonomous agricultural universal production machine 4 is a production machine that may perform an agricultural job autonomously (e.g., without close user monitoring and on the basis of its own automatic actions). In this case, the autonomous agricultural universal production machine 4 may be an unmanned production machine. It may operate alone or in association with network 12, such as with a manned agricultural production machine. For example, it may move the autonomous agricultural production machine along a lane of a manned agricultural production machine or it may automatically determine its lane based on GPS data.

Furthermore, the autonomous agricultural universal production machine 4 may be configured to perform a variety of different agricultural jobs, such as by replacing or attaching work assemblies 5.

In one or some embodiments, when the autonomous agricultural universal production machine 4 changes, attaches, or replaces a work assembly 5, control assemblies concerning the work assembly 5 may likewise be changed, or control assemblies may be added. It is also possible that two (or more than two) autonomous agricultural universal production machines 4 may jointly operate a work assembly 5 (see FIG. 5), so that, for example, two autonomous agricultural universal production machines 4 together with a larger supporting structure with various work assemblies 5 function as a forage harvester, combine harvester, or something else.

In one or some embodiments, the providers 10 are the autonomous agricultural universal production machines 4 themselves, which may rent themselves out within a predetermined framework, as will be explained further below, and may therefore be providers 10 in the narrow sense. Alternatively, the autonomous agricultural universal production machines 4 may be providers 10 in the broad sense, which may perform the agricultural job and may be offered for this purpose but may have little or no involvement in the technical and/or financial transaction.

The swarm assistance system 8 may be the center of the agricultural work network 9, where all communication converges. Alternatively, a decentralized agricultural work network 9 and/or a decentralized swarm assistance system 8 or a mixed form is also contemplated. In this case, the swarm assistance system 8 may be connected to or may be a part of a farm management information system.

The swarm assistance system 8 may comprise hardware, such as a computing unit. The computing unit of the swarm assistance system 8 may comprise at least one processor 17 and at least one memory 18 that stores information and/or software, with the processor configured to execute the software stored in the memory in order to perform the functions described with regard to the swarm assistance system 8. In one or some embodiments, the swarm assistance system 8 may comprise any type of computing functionality, such as the at least one processor 17 (which may comprise a microprocessor, controller, PLA, or the like) and the at least one memory 18. The memory 18 may comprise any type of storage device (e.g., any type of memory). Though the processor 17 and the memory 18 are depicted as separate elements, they may be part of a single machine, which includes a microprocessor (or other type of controller) and a memory. Alternatively, the processor 17 may rely on memory 18 for all of its memory needs. The swarm assistance system 8 may further include a communication interface 19, which is configured to communicate (wired and/or wirelessly) with one or more external electronic devices, such as combine harvester 1, autonomous agricultural universal production machine 4, forage harvester 7, or the like.

The processor 17 and memory 18 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. The above discussion regarding the at least one processor 17 and the at least one memory 18 may be applied to other devices, such as the control hardware in the combine harvester 1, control hardware in the autonomous agricultural universal production machine 4, control hardware in the work assembly 5, control hardware in the rudimentary forage harvester 6, or control hardware in the forage harvester 7.

The swarm assistance system 8 may be purely cloud-based or purely local or comprise a plurality of computing units. In a variant not discussed in more detail here, the swarm assistance system 8 may be arranged or positioned entirely on the autonomous agricultural universal production machine 4 and may be configured there as a module (such as a software module) that communicates with the controller (which is an example of computing functionality) of the autonomous agricultural universal production machine 4, but may be designed separately from the latter in terms of software and hardware. In this case, the swarm assistance system 8 may be arranged or positioned externally to the autonomous agricultural universal production machine 4.

In this case, the capacity data may comprise temporal capacity data and technical capacity data. The technical capacity data may include, for example, machine output, compatibility with work assemblies 5, and the like.

The autonomous agricultural universal production machines 4 may perform the agricultural job alone or as a network 12. The network 12 may comprise (or consist entirely of) autonomous agricultural universal production machines 4. However, in this case, the network 12 may also comprise non-autonomous agricultural production machines that are not autonomous agricultural universal production machines 4. For example, FIG. 2 illustrates a network 12 of autonomous agricultural universal production machines 4 and combine harvesters 1. In this case, the swarm assistance system 8 may also lease autonomous agricultural production machines that are not autonomous agricultural universal production machines 4. In particular, the swarm assistance system 8 may rent networks of autonomous agricultural universal production machines 4 and other autonomous agricultural production machines.

In this case, the swarm assistance system 8 may coordinate the network 12. For this purpose, the swarm assistance system 8 may regulate the communication between the autonomous agricultural production machines of the network 12; in particular, the communication may take place via the swarm assistance system 8.

The network 12 may be organized as a master-follower network. It is therefore also contemplated that the master in the network 12, such as an autonomous agricultural production machine, acts as the customer 11. It may therefore be envisaged that an autonomous agricultural production machine entrusted with an agricultural job automatically rents follower universal production machines as required, or proposes such a rental to at least one user.

Therefore, in the present example, the swarm assistance system 8 may either rent the entire network 12 when a user as a customer 11 requests the harvesting of, for example, wheat in his/her field as an agricultural job, or the user orders, for example, his/her own autonomous combine harvester 1 to do the harvesting, and the latter automatically may order autonomous agricultural universal production machines 4 to assist.

In one or some embodiments, the term "rental" may include the complete process from coordination to assignment of the autonomous agricultural production machine to the task, such as providing process knowledge, such as logistics, up to billing and those financial-technical aspects resulting from autonomy, in particular liability issues and operating license issues, which in turn may be based on machine data, maintenance logs, etc. In this regard, the swarm assistance system 8 may send one or more commands to a respective autonomous agricultural production machine in order for the respective autonomous agricultural production machine to automatically perform the task. One, some or all of the recited steps may be automatically performed. Therefore, the aspects that may prevent an individual user from purchasing an autonomous agricultural production machine may be taken over.

In one or some embodiments, the swarm assistance system 8 is configured to determine specific process knowledge for the autonomous agricultural universal production machine 4 to perform the agricultural job from the request data, the capacity data and additionally from general process data and/or specific process data relating to the requested job, and/or additionally from environmental data, in particular weather data, and to transmit this to the rented autonomous agricultural universal production machine 4 to perform the agricultural job.

Such process knowledge may include any one, any combination, or all of: optimized settings of machine parameters; parameterizations of software modules; weightings of neural networks; route planning 13; or an optimization strategy or the like. The specific process data may comprise, for example, field information data such as any one, any combination, or all of: a fruit type of a crop 3; a soil type; a soil slope; or field-independent process data (such as existing operating resources, and/or preceding, and/or subsequent work steps). General process data may include non-specific process data such as optimized settings of the autonomous agricultural universal production machine 4 for a harvesting operation. Environmental data may be such data that do not directly affect the field but generally affects a larger environment, for example weather data, temperature data and the like. The process knowledge may be used by the autonomous agricultural universal production machine 4 to perform the agricultural job; in particular, the autonomous agricultural universal production machine 4 may use the process knowledge to set machine parameters.

In one or some embodiments, the process knowledge may comprise work assembly-specific work assembly knowledge at least for some, such as for all, work assemblies 5 with which the autonomous agricultural universal production machine 4 may be equipped. In one or some embodiments, the autonomous agricultural universal production machine 4 does not have work assembly-specific work assembly knowledge for some or all of the work assemblies 5 with which it may be equipped, at least in a basic or factory configuration. Alternatively, the autonomous agricultural universal production machine 4 may have work assembly type-specific work assembly knowledge for some or all of the work assemblies 5 with which it may be equipped, at least in the basic or factory configuration. For example, the autonomous agricultural universal production machine 4 may have a basic set of plow-specific work assembly knowledge, but may be equipped by the swarm assistance system 8 with work assembly knowledge concerning the exact type of plow that allows more efficient use of the plow.

In one or some embodiments, therefore, the autonomous agricultural universal production machine 4 may be designed in such a way that it cannot use the particular work assembly 5 without the work-unit-specific work-unit knowledge, or may use it only on the basis of the work-unit-type-specific work-unit knowledge.

The machine parameters may be machine parameters in the narrow sense, such as the engine speed or a position of a choke valve. In one or some embodiments, also included are settings of a rear power lift or the like. The machine parameters may also comprise instructions for setting automatic setting devices or other control systems of the autonomous agricultural universal production machine 4 from which machine parameters in the narrow sense are then generated.

The general process data and or the environmental data may originate from a data source that is not associated with either a provider 10 or a customer 11 of the specific job.

In one or some embodiments, the request data comprises at least field information data. Typically, the customer 11 is the source of the field information data. Alternatively, the field information data may already be saved in a database 14 of the swarm assistance system 8.

Figure 4:
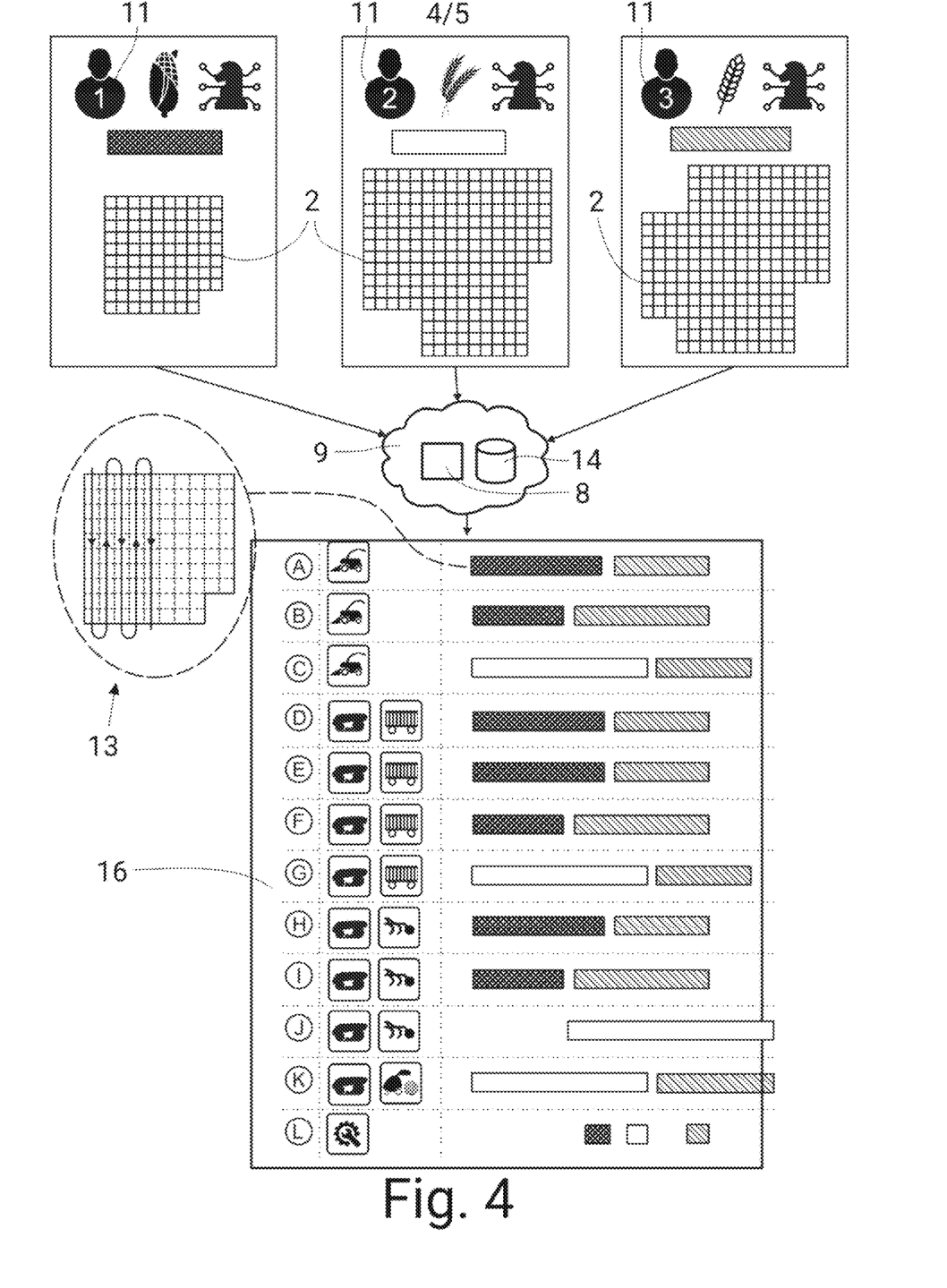
FIG. 4 illustrates a swarm rental plan and its schematic generation.

In one or some embodiments, the capacity data may include at least machine data. The swarm assistance system 8 may then be configured to receive request data from a plurality of customers 11 regarding a plurality of agricultural jobs, and to determine an optimized swarm rental plan 16 from the request data and capacity data of a swarm 15 of autonomous agricultural universal production machines 4, and availability data of a plurality of work assemblies 5. Thus, in one or some embodiments, the swarm rental plan 16 may comprise one or more commands to one or more autonomous agricultural production machines in order for the one or more autonomous agricultural production machines to perform the one or more tasks at the designated time as detailed in the swarm rental plan 16. FIG. 4 illustrates an example of such an optimized allocation of a swarm 15 to different customers 11. By compiling the technical data necessary to determine an optimized swarm rental plan 16 in the swarm assistance system 8, a more efficient use of available resources may be achieved by the customers 11 and providers 10.

The swarm assistance system 8 may be further configured to rent the swarm 15 according to the swarm rental plan 16 and to control the execution of the swarm rental plan 16 (e.g., via one or more commands). Controlling the swarm 15 by the swarm assistance system 8 may include providing any one, any combination, or all of: the process knowledge; the technical supervision of the execution; or technical support of the execution. Further, the swarm assistance system 8 may control the swarm 15 via issuing one or more commands.

In one or some embodiments, a swarm 15 may be understood to be both a swarm 15 in the broad sense (e.g., merely a plurality of autonomous agricultural production machines which are connected by the fact that they jointly act as providers 10 and are part of the agricultural work network 9) and/or a swarm 15 in the narrow sense (e.g., a network 12 of autonomous agricultural production machines which jointly perform an agricultural job).

In one or some embodiments, the swarm assistance system 8 is configured to update the swarm rental plan 16 responsive to any one, any combination, or all of: over time (e.g., periodically); upon receipt of additional request data and/or receipt of changed request data, and/or receipt of capacity data; or responsive to availability data of agricultural work assemblies 5.

In one or some embodiments, the swarm assistance system 8 is configured to create and update the swarm rental plan 16 along the line of rough and detailed planning. Initially, the swarm assistance system 8 may be configured to determine a rough plan based in particular on estimates, for example of weather data based on average data, and as new requests and more accurate weather data are added, a deviation from the rough plan may arise to which the swarm assistance system 8 reacts (e.g., the swarm assistance system 8 is configured to update the rough plan responsive to updates in weather data and/or responsive to new requests).

In one or some embodiments, the swarm assistance system 8 is configured to respond to deviations over time by determining actions to address the deviation. The actions may include allocating further resources to a specific agricultural job (e.g., further autonomous agricultural universal production machines 4 to perform the specific agricultural job); and/or changing the allocation of autonomous agricultural universal production machines 4 (e.g., using an autonomous agricultural universal production machine 4 with more or also less harvesting capacity). Alternatively, or in addition, the swarm assistance system 8 may be configured to respond to deviations over time by updating major portions of, or redetermine, the swarm rental plan 16.

In one or some embodiments, the swarm assistance system 8 is configured to: (i) perform a simulation of the performance of the requested job or jobs by different autonomous agricultural universal production machines 4 in different configurations and/or combinations and/or assignments between the autonomous agricultural universal production machines 4 and the requested jobs; and (ii) determine and/or update an optimized swarm rental plan 16 based on the simulation.

Different configurations may be understood to mean different work assemblies 5, software modules and the like. The combinations may include, for example, network structures and network participants.

In one or some embodiments, the larger the swarm 15, the more efficient the processing of the agricultural jobs may be. The optimization objective with respect to which the swarm rental plan 16 is optimized may be an efficiency, such as a cost efficiency and/or a resource efficiency. The optimization of the swarm rental plan 16 may depend on the process knowledge that may be provided to a particular autonomous agricultural universal production machine 4. However, this process knowledge may be dependent on the autonomous agricultural universal production machine 4 itself, field information, any network 12, and the like. A problem may therefore exist in which many of the variables are interdependent. Therefore, in one or some embodiments, the swarm assistance system 8 may be configured to simulate different solutions to determine an optimized swarm rental plan 16. In this regard, at the core of the possibility of achieving an optimized swarm leasing plan or optimized swarm rental plan 16, and therefore ultimately optimized field processing, is the swarm assistance system 8.

In one or some embodiments, the swarm assistance system 8 is configured to control the execution of the swarm rental plan 16 in that the swarm assistance system 8 is configured perform one or both of: communicate to the swarm 15 individual process knowledge for performing the plurality of agricultural jobs; and/or determine and coordinates logistics of the swarm 15 and/or the plurality of work assemblies 5.

In one or some embodiments, autonomous agricultural universal production machines 4 may not be allowed to drive on roads alone. In addition, at times, autonomous agricultural universal production machines 4 may need to be combined with the work assemblies 5 so that they are physically attached to one another. If there is no solution for these problems, the swarm rental plan 16 may be incomplete. Therefore, the swarm assistance system 8 may take logistics into account when the swarm rental plan 16 is being created. For example, the swarm assistance system 8 may (separate from the control once the autonomous agricultural universal production machines 4 and the work assemblies 5 are at the final site) generate the swarm rental plan 16 to include the commands, etc. in order for the autonomous agricultural universal production machines 4 and the work assemblies 5 to travel to the final site.

Another variant provides that the request data may comprise a quantitative work result (e.g., any one, any combination, or all of: a harvest amount; a working depth; or an area of a soil cultivation (such that the swarm assistance system 8 is configured to sell an achievement of the quantitative work result)). Alternatively, or in addition, the swarm assistance system 8 may be configured to ensure that the quantitative work result is realized by renting one or more of the autonomous agricultural production machines depending on their capacity data.

A quantitative work result may be, for example, a quantity of tons of harvested material, or an area to be plowed including plowing depth. In the present case, it may be difficult for a user to foresee how many autonomous agricultural universal production machines 4 he/she will need in which configuration. Therefore, there may be an obstacle to understanding the manifold technical interrelationships that the swarm assistance system 8 depicts. This problem of understanding may be solved by decoupling the user from the technical interrelationships.

Thus, in one or some embodiments, the swarm assistance system 8 is configured to obtain a route plan 13 as part of the request data and/or to generate a route plan 13 for the requested job, such that the swarm assistance system 8 may take the route plan 13 into account in the simulation for determining the optimized swarm rental plan 16.

The route plan 13 may be based on historical routes to the cultivation area 2, may be determined based on field records by the swarm assistance system 8, or may be specified by a user according to user-preference.

The route planning 13 may also depend on the agricultural job. In one or some embodiments, the swarm assistance system 8 is configured to rent the autonomous agricultural universal production machine 4 for main activities and/or for secondary activities. A main activity may comprise primary field cultivation (e.g., plowing, harvesting, or the like). A secondary activity may, for example, comprise the prior search for wild animals, the removal of harvested material, or the towing of a trailer of harvested material, as shown in FIG. 2 and FIG. 3.

The route planning 13 may depend on different zones of the cultivated area 2. A secondary activity may also be the determination of such zones by test drives, soil samples or the like. The field cultivation itself may also depend on the field zones and may be planned accordingly by the swarm assistance system 8.

In one or some embodiments, the swarm assistance system 8 may be configured as a decentralized system in which the autonomous agricultural universal production machines 4 cooperate with each other on line to provide the swarm assistance system 8. In this variant, the autonomous agricultural universal production machines 4 may form the swarm assistance system 8 or a part thereof. They may combine their computing power and/or exchange some or all of the data mentioned herein. For example, an autonomous agricultural universal production machine 4 may transmit field information data from a past field cultivation to another autonomous agricultural universal production machine 4 that has been rented for an agricultural job in that field.

Alternatively, the swarm assistance system 8 may be designed as a central system which is connected to a plurality of autonomous agricultural universal production machines 4 via the agricultural work network 9.

In one or some embodiments, the central swarm assistance system 8 is external to the autonomous agricultural universal production machines 4, such as cloud-based.

In accordance with another teaching, which is independently relevant, a method is also claimed for carrying out an agricultural job using an autonomous agricultural universal production machine 4. In one or some embodiments of the method, any one, any combination, or all of the following may be performed: the swarm assistance system 8 may be integrated into an agricultural work network 9; the agricultural work network 9 may connect autonomous agricultural universal production machines for as providers 10 of agricultural jobs and customers for agricultural jobs 11 to one another and to the swarm assistance system 8; the autonomous universal production machines 4 may be configured to perform a plurality of different agricultural jobs by being equipped with changing work assemblies 5; the swarm assistance system 8 may be configured to receive request data relating to a requested agricultural job from the customers 11 to match the request data with capacity data of at least one of the agricultural universal production machines 4 and, based on the result of the matching, rent of at least one agricultural universal production machine 4 to perform the requested agricultural job; and the agricultural universal production machine 4 may perform the requested agricultural job.

Reference may be made to all statements concerning the proposed swarm assistance system. All process steps described herein, in particular those which the swarm assistance system 8 or the autonomous agricultural universal production machine 4 are configured to perform, may be the subject of the method individually or in any combination.

Furthermore, in one or some embodiments, the autonomous agricultural universal production machines 4 act as providers 10 in such a way that they rent themselves, such as within a predetermined framework, and that the autonomous agricultural universal production machines 4 independently transmit their capacity data to the swarm assistance system 8 for this purpose, and independently perform rentals in cooperation with the swarm assistance system 8.

The framework may be specified by an owner of the autonomous agricultural universal production machine 4, for example depending on his own need to use the autonomous agricultural universal production machine 4.

In one or some embodiments, an autonomous agricultural production machine configured for use in the disclosed method is further disclosed. Reference may be made to all statements concerning the proposed method and the proposed swarm assistance system 8.

In one or some embodiments, a computer program product is disclosed which comprises instructions which, when executed, cause a proposed computing unit to function as the swarm assistance system 8 disclosed above. Reference may be made to all statements concerning the proposed method, the proposed swarm assistance system, and the proposed autonomous agricultural production machine.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Combine harvester
2 Cultivated area
3 Crop
4 Universal production machine
5 Work assembly
6 Rudimentary forage harvester
7 Forage harvester
8 Swarm assistance system
9 Agricultural work network
10 Provider
11 Customer
12 Network
13 Route plan
14 Database
15 Swarm
16 Swarm rental plan
17 Processor
18 Memory
19 Communication interface
20 Computational functionality

The invention claimed is:

1. A system comprising a swarm assistance system and a plurality of autonomous agricultural production machines, the system comprising: the swarm assistance system comprising: at least one communication interface; and at least one processor in communication with the at least one communication interface and configured to: integrate into an agricultural work network, wherein the agricultural work network is configured to connect the plurality of autonomous agricultural production machines as providers of agricultural jobs and a plurality of customers of agricultural jobs to each other and to the swarm assistance system, wherein the plurality of autonomous agricultural production machines are configured to perform a variety of different agricultural jobs by being equipped with changing work assemblies; receive request data relating to at least one requested agricultural job at least one job location from a respective customer of the plurality of customers, wherein the at least one requested agricultural job comprises a field cultivation job and a secondary job related to the field cultivation job; responsive to receiving the at least one requested agricultural job that comprises the field cultivation job and the secondary job related to the field cultivation job: automatically analyze capacity of one or more autonomous agricultural production machines of the plurality of autonomous agricultural production machines to determine whether the one or more autonomous agricultural production machines has the capacity to perform the at least one requested agricultural job; automatically select, based on the request data indicating the at least one requested agricultural job and the analysis of the capacity, the one or more autonomous agricultural production machines that is a subset of the plurality of autonomous agricultural production machines needed to perform the field cultivation job and the secondary job of the at least one requested agricultural job and equipping the one or more autonomous agricultural production machines with at least one work assembly tailored to performing the at least one requested agricultural job; automatically generate one or more routes for routing the one or more autonomous agricultural production machines to the at least one job location; automatically send one or more commands to the one or more autonomous agricultural production machines for configuration with the at least one work assembly tailored to performing the at least one requested agricultural job in order for the one or more autonomous agricultural production machines with the at least one work assembly to automatically perform both the field cultivation job and the secondary job of the at least one requested agricultural job for the respective customer at least one designated time; the plurality of autonomous agricultural production machines, wherein, responsive to the one or more autonomous agricultural production machines receiving the one or more commands, the one or more autonomous agricultural production machines are configured to automatically travel to the at least one job location according to the one or more routes; wherein, responsive to the one or more autonomous agricultural production machines receiving the one or more commands, the one or more autonomous agricultural production machines are configured to automatically perform both the field cultivation job and the secondary job of the at least one requested agricultural job at the at least one designated time with the at least one work assembly tailored to performing the at least one requested agricultural job; and wherein, responsive to completing the at least one requested agricultural job, the swarm assistance system is configured to, responsive to receiving at least one other requested agricultural job from another respective customer of the plurality of customers:

determine whether to select the one or more autonomous agricultural production machines along with other autonomous agricultural production machines of the plurality of autonomous agricultural production machines to perform the at least one other requested agricultural job; and responsive to selecting at least one of the one or more autonomous agricultural production machines to perform the at least one other requested agricultural job, send the one or more commands for at least one of the one or more autonomous agricultural production machines to perform part or all of the at least one other requested agricultural job.

2. The swarm assistance system of claim 1, wherein the at least one processor is configured to select at least one autonomous agricultural production machine to perform the at least one requested agricultural job based on the request data, capacity data, and process data related to one or both of the at least one requested agricultural job and environmental data.

3. The swarm assistance system of claim 1, wherein the at least one processor is configured to perform a simulation of performance of a plurality of requested agricultural jobs by different autonomous agricultural production machines in one or more of different configurations, different combinations, or different assignments between the plurality of autonomous agricultural production machines and the plurality of requested agricultural jobs; and wherein the at least one processor is configured to determine optimized swarm rental plans based on the simulation.

4. The swarm assistance system of claim 3, where the at least one processor is configured to automatically generate route plans for the plurality of requested agricultural jobs; and wherein the at least one processor is configured to use the route plans in the simulation for determining the optimized swarm rental plans in order to determine which of the plurality of autonomous agricultural production machines to select to perform the plurality of requested agricultural jobs.

5. The swarm assistance system of claim 1, wherein the at least one processor of the swarm assistance system is configured to automatically select the one or more autonomous agricultural production machines based on automatic negotiations of rental by at least one of the one or more autonomous agricultural production machines.

6. The swarm assistance system of claim 5, wherein the at least one of the one or more autonomous agricultural production machines is configured to transmit capacity data to the swarm assistance system, wherein the capacity data indicative of the capacity to perform the at least one requested agricultural job; and wherein the at least one processor is configured to automatically select the one or more autonomous agricultural production machines to perform the at least one requested agricultural job based on the capacity data.

7. The swarm assistance system of claim 1, wherein the field cultivation job comprises a harvesting task and the secondary job related to the field cultivation comprises a baling task; wherein the at least one processor of the swarm assistance system is configured to: select one or more autonomous harvesters to automatically perform the harvesting task; select one or more autonomous balers to automatically perform the baling task at the at least one designated time at which straw has reached a designated moisture content in order to generate bales; wherein the one or more autonomous harvesters, responsive to receiving the one or more commands, are configured to automatically perform the harvesting task; and wherein the one or more autonomous balers, responsive to receiving the one or more commands, are configured to automatically generate the bales.

8. The swarm assistance system of claim 7, wherein the harvesting task comprises: harvesting a crop and placing the crop into one or more tanks; and transporting the one or more tanks; wherein the baling task comprises: generating the bales; and transporting the bales; wherein the at least one processor of the swarm assistance system is configured to: select the one or more autonomous harvesters to automatically harvest the crop and automatically place the crop into the one or more tanks; select one or more autonomous tank transport devices to automatically transport the one or more tanks; select one or more autonomous balers to automatically generate the bales at the at least one designated time at which straw has reached a designated moisture content in order to generate bales; and select one or more autonomous bale transport devices to automatically transport the bales; wherein the one or more autonomous harvesters, responsive to receiving the one or more commands, are configured to automatically harvest the crop and automatically place the crop into the one or more tanks; wherein the one or more autonomous tank transport devices, responsive to receiving the one or more commands, are configured to automatically transport the one or more tanks; and wherein the one or more autonomous bale transport devices, responsive to receiving the one or more commands, are configured to automatically transport the bales.

9. The swarm assistance system of claim 1, wherein the secondary job comprises one of searching for wild animals, removal of harvested material, or towing a trailer of the harvested material.

10. The swarm assistance system of claim 1, wherein the at least one processor of the swarm assistance system is further configured to: receive at least one deviation regarding the at least one requested agricultural job; automatically select, based on the at least one deviation, different one or more autonomous agricultural production machines to perform the at least one requested agricultural job in order to update allocation of autonomous resources; and automatically send the one or more commands to the different one or more autonomous agricultural production machines in order for the different one or more autonomous agricultural production machines to automatically perform the at least one requested agricultural job; and wherein, responsive to the different one or more autonomous agricultural production machines receiving the one or more commands, the different one or more autonomous agricultural production machines are configured to automatically perform the at least one requested agricultural job thereby updating the allocation of autonomous resources.

11. The swarm assistance system of claim 10, wherein the at least one deviation comprises one or more of: additional request data from another respective customer; receipt of changed request data from the respective customer; or receipt of additional capacity data for the plurality of autonomous agricultural production machines.

12. The swarm assistance system of claim 10, wherein the at least one processor is configured to determine an initial plan to select the one or more autonomous agricultural production machines to perform the at least one requested agricultural job and to update the initial plan responsive to updates in one or both of weather data or responsive to receiving a new request for an agricultural job from another respective customer.

13. The swarm assistance system of claim 10, wherein the at least one processor is configured to automatically select, based on the at least one deviation, different one or more autonomous agricultural production machines to perform the at least one requested agricultural job in order to update allocation of autonomous resources by: adding at least one autonomous agricultural production machine from the plurality of autonomous agricultural production machines.

14. The swarm assistance system of claim 10, wherein the at least one processor is configured to automatically select, based on the at least one deviation, different one or more autonomous agricultural production machines to perform the at least one requested agricultural job in order to update allocation of autonomous resources by: selecting the different one or more autonomous agricultural production machines with less harvesting capacity.

15. The swarm assistance system of claim 10, wherein the at least one processor is configured to automatically select, based on the at least one deviation, different one or more autonomous agricultural production machines to perform the at least one requested agricultural job in order to update allocation of autonomous resources by: selecting the different one or more autonomous agricultural production machines with more harvesting capacity.

16. A method for performing an agricultural job using an autonomous agricultural production machine, the method comprising: integrating a swarm assistance system into an agricultural work network, wherein the agricultural work network connects a plurality of autonomous agricultural production machines as providers of agricultural jobs and a plurality of customers of agricultural jobs to one another and to the swarm assistance system, wherein the plurality of autonomous agricultural production machines are configured to perform a variety of different agricultural jobs by being equipped with changing work assemblies; receiving, by the swarm assistance system, request data relating to at least one requested agricultural job for at least one job location from a respective customer of the plurality of customers, wherein the at least one requested agricultural job comprises a field cultivation job and a secondary job related to the field cultivation job; responsive to receiving the at least one requested agricultural job that comprises the field cultivation job and the secondary job related to the field cultivation job: automatically analyzing capacity of one or more autonomous agricultural production machines of the plurality of autonomous agricultural production machines to determine whether the one or more autonomous agricultural production machines has the capacity to perform the at least one requested agricultural job; automatically selecting, based on the request data indicating the at least one requested agricultural job and the analysis of the capacity, one or more autonomous agricultural production machines that is a subset of the plurality of autonomous agricultural production machines needed to perform the field cultivation job and the secondary job of the at least one requested agricultural job and equipping the one or more autonomous agricultural production machines with at least one work assembly tailored to performing the at least one requested agricultural job; automatically generating one or more routes for routing the one or more autonomous agricultural production machines to the at least one job location; automatically sending one or more commands to the one or more autonomous agricultural production machines for routing, based on the one or more routes generated, the one or more autonomous agricultural production machines to the at least one job location and for configuration with the at least one work assembly tailored to performing the at least one requested agricultural job in order for the one or more autonomous agricultural production machines with the at least one work assembly to automatically perform both the field cultivation job and the secondary job of the at least one requested agricultural job for the respective customer at least one designated time; responsive to the one or more autonomous agricultural production machines receiving the one or more commands, automatically travelling, by the one or more autonomous agricultural production machines, to the at least one job location according to the one or more routes; responsive to the one or more autonomous agricultural production machines receiving the one or more commands, automatically performing, by the one or more autonomous agricultural production machines, both the field cultivation job and the secondary job of the at least one requested agricultural job at the at least one designated time with the at least one work assembly tailored to performing the at least one requested agricultural job; and responsive to completing the at least one requested agricultural job, the swarm assistance system, responsive to receiving at least one other requested agricultural job from another respective customer of the plurality of customers: determining whether to select the one or more autonomous agricultural production machines along with other autonomous agricultural production machines of the plurality of autonomous agricultural production machines to perform the at least one other requested agricultural job; and responsive to selecting at least one of the one or more autonomous agricultural production machines to perform the at least one other requested agricultural job, sending the one or more commands for at least one of the one or more autonomous agricultural production machines to perform part or all of the at least one other requested agricultural job.

17. The method of claim 16, wherein the plurality of autonomous agricultural production machines act as providers in such a way that they rent themselves within a predetermined framework; and wherein the plurality of autonomous agricultural production machines independently transmit their capacity data to the swarm assistance system for renting themselves; and wherein the plurality of autonomous agricultural production machines independently perform rentals in cooperation with the swarm assistance system.

18. One or more autonomous agricultural production machines configured to perform at least one requested agricultural job, the at least one requested agricultural job comprises a field cultivation job and a secondary job related to the field cultivation job, the one or more autonomous agricultural production machines comprising: at least one communication interface; and at least one processor in communication with the at least one communication interface and configured to: integrate into an agricultural work network, wherein the agricultural work network is configured to connect the one or more autonomous agricultural production machines and other autonomous agricultural production machines as providers of agricultural jobs and a plurality of customers of agricultural jobs to each other and to a swarm assistance system, wherein a plurality of autonomous agricultural production machines are configured to perform a variety of different agricultural jobs by being equipped with changing work assemblies; receive, from the swarm assistance system, one or more routes for travelling to at least one job location to perform the field cultivation job and the secondary job of the at least one requested agricultural job responsive to selection by the swarm assistance system of the one or more autonomous agricultural production machines based on capacity of the one or more autonomous agricultural production machines to perform the at least one requested agricultural job; automatically travel, according to the one or more routes generated by the swarm assistance system to the at least one job location for the at least one requested agricultural job; and automatically perform both the field cultivation job and the secondary job of the at least one requested agricultural job at the at least one job location and at least one designated time with at least one work assembly tailored to performing the at least one requested agricultural job based on one or more communications with the swarm assistance system, wherein the one or more autonomous agricultural production machines are configured to automatically travel to the at least one job location and perform both the field cultivation job and the secondary job of the at least a part of the at least one requested agricultural job responsive to the swarm assistance system sending the one or more communications based on: receiving request data relating to the at least one requested agricultural job from a respective customer of the plurality of customers; automatically selecting, based on the request data indicating the at least one requested agricultural job and based on analysis of the capacity of the one or more autonomous agricultural production machines to perform the field cultivation job and the secondary job of the at least one requested agricultural job, the one or more autonomous agricultural production machines from a subset of the plurality of autonomous agricultural production machines needed to perform the at least one requested agricultural job and equipping the one or more autonomous agricultural production machines with at least one work assembly tailored to performing the at least one requested agricultural job; automatically sending one or more commands to the one or more autonomous agricultural production machines for configuration with the at least one work assembly tailored to performing the at least one requested agricultural job in order for the one or more autonomous agricultural production machines with the at least one work assembly to automatically perform both the field cultivation job and the secondary job of the at least a part of the at least one requested agricultural job for the respective customer at least one designated time.

19. A non-transient computer readable medium comprising instructions that, when executed, cause a computing device to function as a swarm assistance system to perform the method of: integrating into an agricultural work network, wherein the agricultural work network is configured to connect a plurality of autonomous agricultural production machines as providers of agricultural jobs and a plurality of customers of agricultural jobs to each other and to the swarm assistance system, wherein the plurality of autonomous agricultural production machines are configured to perform a variety of different agricultural jobs by being equipped with changing work assemblies; receiving, by the swarm assistance system, request data relating to at least one requested agricultural job at least one job location from a respective customer of the plurality of customers, wherein the at least one requested agricultural job comprises a field cultivation job and a secondary job related to the field cultivation job; responsive to receiving the at least one requested agricultural job that comprises the field cultivation job and the secondary job related to the field cultivation job: automatically analyzing capacity of one or more autonomous agricultural production machines of the plurality of autonomous agricultural production machines to determine whether the one or more autonomous agricultural production machines has the capacity to perform the at least one requested agricultural job; automatically selecting, based on the request data indicating the at least one requested agricultural job and the analysis of the capacity, the one or more autonomous agricultural production machines that is a subset of the plurality of autonomous agricultural production machines needed to perform the field cultivation job and the secondary job of the at least one requested agricultural job and equipping the one or more autonomous agricultural production machines with at least one work assembly tailored to performing the at least one requested agricultural job; automatically generating one or more routes for routing the one or more autonomous agricultural production machines to the at least one job location; automatically sending one or more commands to the one or more autonomous agricultural production machines for configuration with the at least one work assembly tailored to performing the at least one requested agricultural job in order for the one or more autonomous agricultural production machines with the at least one work assembly to automatically perform both the field cultivation job and the secondary job of the at least one requested agricultural job for the respective customer at least one designated time; responsive to the one or more autonomous agricultural production machines receiving the one or more commands, automatically travelling, by the one or more autonomous agricultural production machines, to the at least one job location according to the one or more routes; responsive to the one or more autonomous agricultural production machines receiving the one or more commands, automatically performing, by the one or more autonomous agricultural production machines, both the field cultivation job and the secondary job of the at least one requested agricultural job at the at least one designated time with the at least one work assembly tailored to performing the at least one requested agricultural job; and responsive to completing the at least one requested agricultural job, the swarm assistance system, responsive to receiving at least one other requested agricultural job from another respective customer of the plurality of customers: determining whether to select the one or more autonomous agricultural production machines along with other autonomous agricultural production machines of the plurality of autonomous agricultural production machines to perform the at least one other requested agricultural job; and responsive to selecting at least one of the one or more autonomous agricultural production machines to perform the at least one other requested agricultural job, sending the one or more commands for at least one of the one or more autonomous agricultural production machines to perform part or all of the at least one other requested agricultural job.

\* \* \* \* \*